US007133420B2

(12) United States Patent
Chang et al.

(10) Patent No.: US 7,133,420 B2
(45) Date of Patent: Nov. 7, 2006

(54) METHODS AND SYSTEMS FOR TRIGGERLESS SCREENING OF WIRELESS MESSAGE SERVICE MESSAGES FOR DELIVERY WITH DIFFERENTIAL QUALITY OF SERVICE

(75) Inventors: James Tjin-Tek Chang, Chapel Hill, NC (US); Rick L. Allison, Apex, NC (US); Thomas M. McCann, Morrisville, NC (US)

(73) Assignee: Tekelec, Calabasas, CA (US)

( * ) Notice: Subject to any disclaimer, the term of this patent is extended or adjusted under 35 U.S.C. 154(b) by 422 days.

(21) Appl. No.: 10/295,725

(22) Filed: Nov. 15, 2002

(65) Prior Publication Data

US 2004/0095889 A1 May 20, 2004

(51) Int. Cl.
 *H04J 1/14* (2006.01)
(52) U.S. Cl. .................... 370/496; 370/252; 709/227
(58) Field of Classification Search ............ 370/351, 370/252, 329, 437, 496, 352–356, 400, 401, 370/328, 469, 475; 709/206, 227; 455/423, 455/412, 438, 90.2, 437
 See application file for complete search history.

(56) References Cited

U.S. PATENT DOCUMENTS

| 5,903,726 A | 5/1999 | Donovan et al. .......... 709/206 |
| 6,275,695 B1 * | 8/2001 | Obhan ....................... 455/423 |
| 6,515,985 B1 * | 2/2003 | Shmulevich et al. ....... 370/356 |
| 6,556,586 B1 * | 4/2003 | Sipila ......................... 370/469 |
| 6,611,516 B1 * | 8/2003 | Pirkola et al. .............. 370/352 |
| 2002/0119794 A1 | 8/2002 | Byers et al. |
| 2002/0126708 A1 | 9/2002 | Skog et al. |
| 2003/0105825 A1 | 6/2003 | Kring et al. |
| 2004/0174859 A1 * | 9/2004 | Serroyen et al. ............ 370/351 |

FOREIGN PATENT DOCUMENTS

| EP | 0 743 777 A2 | 11/1996 |
| EP | 1 079 642 A1 | 2/2001 |
| WO | WO 00/79813 | 12/2000 |

OTHER PUBLICATIONS

European Search Report for EP Application No./Patent No. 03796407.9 —2416 PCT/US0336521 (Mar. 23, 2006).
Blum et al., "The Global Store Server—A Multimedia Teleservice Component," XP 000585293, pp. 35-46 (Nov. 13, 1994).

* cited by examiner

*Primary Examiner*—John Pezzlo
(74) *Attorney, Agent, or Firm*—Jenkins, Wilson, Taylor & Hunt, P.A.

(57) ABSTRACT

Methods and systems for triggerless screening of WMS messages for delivery with differential quality of service (QoS) are disclosed. Signaling messages are screened to determine whether they contain WMS content. In response to determining that a message contains WMS content, origination and/or destination party information is extracted from the WMS message to determine the QoS associated with the WMS message. The WMS message is then modified to include routing information for delivering the SMS messages to their intended destinations with different qualities of service.

51 Claims, 6 Drawing Sheets

US 7,133,420 B2

METHODS AND SYSTEMS FOR TRIGGERLESS SCREENING OF WIRELESS MESSAGE SERVICE MESSAGES FOR DELIVERY WITH DIFFERENTIAL QUALITY OF SERVICE

TECHNICAL FIELD

The present invention relates to methods and systems for providing enhanced delivery options for wireless message service messages. More particularly, the present invention relates to methods and systems for triggerlessly screening wireless message service messages for delivery with differential quality of service.

BACKGROUND ART

Wireless message services (WMS) include short message service, enhanced message service, and multimedia message service. Short message service is a service provided by mobile telecommunications network providers that allows end users to send short text messages, referred to as "short messages" or "SMS messages," to each other using their mobile handsets. The volume of SMS message traffic is expected to greatly increase due to an increase in the number of mobile subscribers and an increase in the number of existing mobile subscribers that use short message service. This increase in SMS message traffic can result in network congestion at the nodes responsible for delivering or routing this traffic. For example, in most mobile communications networks, the nodes responsible for delivering SMS messages are referred to as short message service centers or SMSCs. SMSCs store short messages until a mobile subscriber becomes available, upon which time they deliver the short messages to the mobile subscribers via the mobile switching center associated with the mobile subscriber. The links connected to SMSCs and/or the nodes themselves are expected to become increasingly congested as the volume of SMS message traffic increases.

Enhanced message service or EMS allows users to attach icons or personalized pictures, as well as dynamic ring tones to SMS text messages. Multimedia service or MMS messages will allow users to attach audio and video files to text messages. Like SMS, the volume of EMS and MMS message is also expected to increase, especially as the capabilities of mobile handsets and mobile communications networks continue to expand.

One problem associated with conventional mobile communications networks is that there is currently no efficient mechanism for guaranteeing a particular quality of service for WMS message delivery or for selecting among different qualities of service. For example, it may be desirable to deliver emergency SMS messages to a mobile subscriber or center with enhanced priority. However, the wireless message center and/or the links connected to the message center associated with delivering the SMS message to the subscriber may be congested. This will result in the SMS message being dropped or delayed. Another example in which it may be desirable to send wireless messages with enhanced quality of service is when a subscriber is willing to pay for enhanced delivery. However, current mobile communications networks offer only a single, non-guaranteed quality of service.

Accordingly, in light of these difficulties associated with conventional wireless message delivery mechanisms, there exists a need for improved methods and systems for delivering WMS messages with enhanced or differential quality of service.

SUMMARY OF THE INVENTION

The present invention includes methods and systems for providing multitiered WMS message delivery in a telecommunications network. For example, using the present invention, a network operator may offer WMS subscribers the option of standard WMS service or premium WMS service. WMS messages sent under the standard WMS service option may be routed to a first wireless message service center (WMSC), where the first WMSC is configured to receive, process, and deliver WMS messages with a non-guaranteed quality of service (QoS). WMS messages sent under the premium WMS service option may be routed to a second WMSC, where the second WMSC is configured to receive, process, and deliver WMS messages in the network with enhanced or guaranteed QoS. Alternatively, or in addition to using different WMSCs to provide differential quality of service, the present invention may also include using different routes to provide differential quality of service.

QoS metrics may include network transit time, message delivery time, WMSC storage/processing time, etc. In general, selecting a higher QoS WMS may ensure that a WMS message will be delivered to the appropriate destination faster than the same WMS message would be delivered with low or non-guaranteed QoS WMS delivery. High QoS WMS may guarantee improved delivery performance or at least provide minimum delivery performance parameters. Additionally, a high or premium WMS service option may provide the WMS message originator with a return receipt or delivery confirmation message, which may include WMS delivery performance information, such as time sent by message originator, time to transit the network, storage and processing time at WMSC, time of delivery to message recipient, time that message is opened or read by message recipient, time that message is discarded by message recipient, etc. High QoS WMS would be advantageous, for example, for emergency services (e.g., 911 service, fire, police, medical, security, etc.), where fast, reliable communications are essential.

Although separate guaranteed QoS WMSC and non-guaranteed QoS WMSC network elements are described above, a single WMSC may be provisioned to provide both guaranteed and non-guaranteed QoS service tiers without departing from the scope of the invention. Moreover, more than two QoS WMS service tiers may be provided in a network without departing from the scope of the invention.

According to the present invention, WMS QoS options or service tiers may be implemented using a network routing node, such as a signaling system 7 signal transfer point (STP) or any other type of WMS message router (e.g., an Internet protocol router). Such WMS service tiers may also be implemented using a network element that serves as a front-end processor for one or more WMSC nodes.

Accordingly, it is an object of the invention to provide methods and systems for delivering WMS messages with differential quality of service.

It is another object of the invention to provide methods and systems for delivering WMS messages with enhanced quality of service.

It is yet another object of the invention to provide triggerless methods and systems for screening WMS messages for quality of service purposes.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
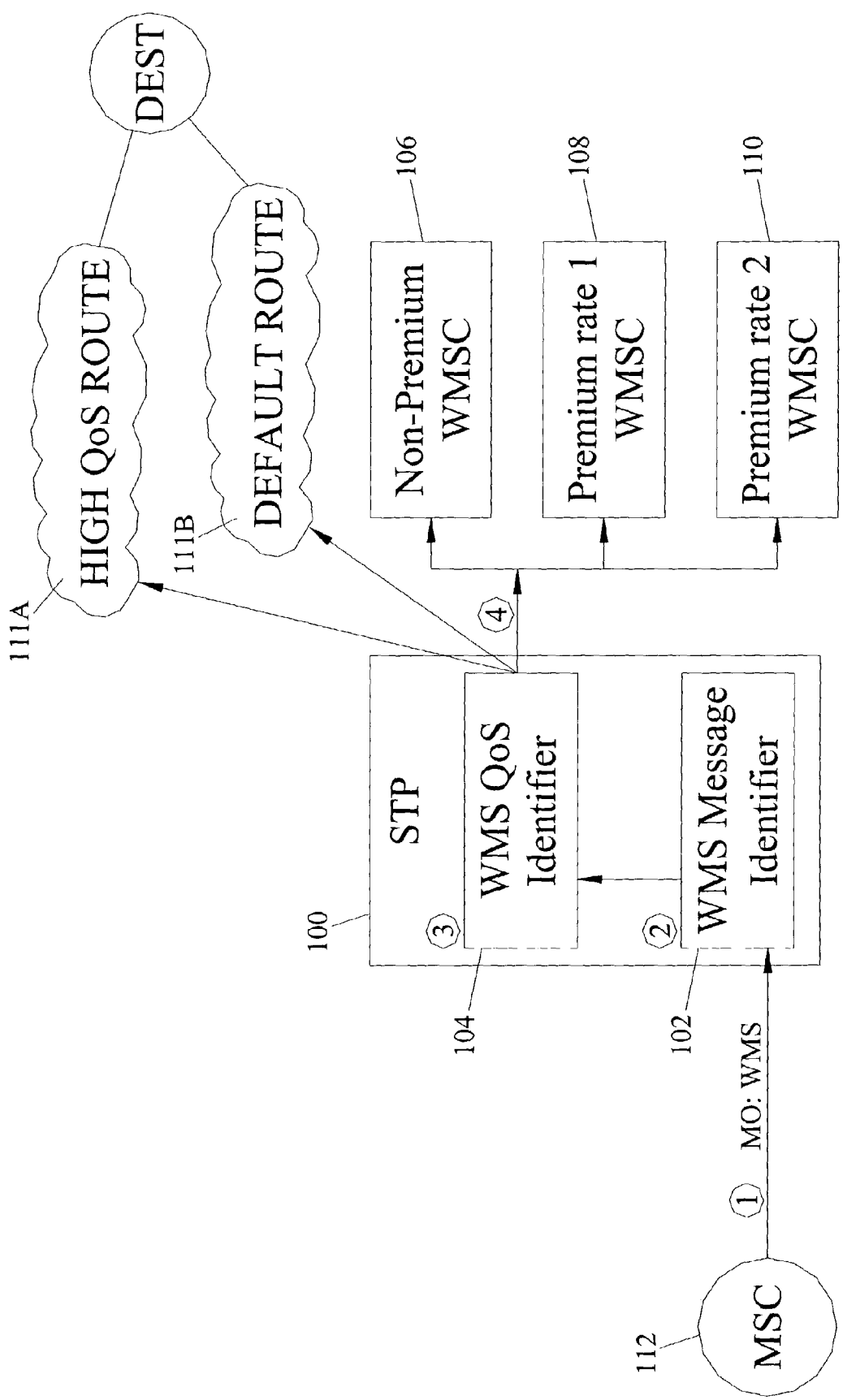
FIG. 1 is a block diagram of a system for triggerlessly screening WMS messages for delivery with differential quality of service according to an embodiment of the present invention.

The present invention includes methods and systems for triggerlessly screening WMS messages so that the messages can be delivered with different qualities of service. FIG. 1 illustrates one example of a system for triggerlessly screening WMS messages for differential quality of service delivery. By "triggerless screening," it is meant that WMS messages can be screened for QoS purposes without requiring queries and responses from a mobile switching center to determine the QoS for the messages. In addition, triggerless screening may include screening messages that are not addressed to a WMS QoS screening node. A triggerless WMS QoS screening node receives WMS messages from an MSC, screens the WMS messages, identifies the quality of service associated with the messages, and forwards the messages to wireless message service centers for delivery with the appropriate quality of service.

Referring to FIG. 1, a triggerless WMS QoS screening node 100 may be implemented as a signal transfer point in a mobile communications network. Screening node 100 may include a WMS message identifier 102 for identifying WMS messages and a WMS quality of service identifier 104 for identifying WMS messages that require enhanced quality of service and for routing these messages to the appropriate destination. As will be discussed in more detail below, one parameter that may be used to identify the quality of service associated with a WMS message includes a mobile subscriber identifier, such as an international mobile subscriber identification (IMSI), a mobile subscriber ISDN (MSISDN) number, a mobile identification number (MIN), a mobile directory number (MDN), or any other mobile subscriber identifier carried in WMS messages.

In order to provide differential quality of service, a network may include multiple WMSCs, each associated with a particular quality of service. As used herein, the term WMSC refers to a node capable of delivering SMS, EMS, and/or MMS messages. For example, a WMSC may be a short message service center for delivering SMS and EMS messages, a multimedia service center for delivering MMS messages, or any combination thereof. In addition, or alternatively, a network may include one or more high QoS routes to WMS destinations. In the example illustrated in FIG. 1, a non-premium WMSC 106 delivers WMS messages with a first quality of service level. A premium rate one WMSC 108 may deliver WMS messages with a second quality of service higher than the first quality of service. A premium rate two WMSC 110 may deliver WMS messages with a third quality of service that is higher than the first and second qualities of service. A high QoS route 111A may provide enhanced delivery of WMS messages to their intended destinations, and a default route 111B may provide delivery of SMS messages to their intended destinations with default or standard QoS. High QoS route 111A may be implemented using any suitable mechanism for providing enhanced delivery. For example, high QoS route 111A may be implemented by marking packets containing the WMS message for expedited delivery and using Diffserv or other packet-based QoS mechanism for providing enhanced delivery. Methods for marking packets for enhanced quality of service suitable for use with embodiments of the present invention include VLAN tagging, MPLS labeling, and using priority fields in IP headers. CR-LDP or RSVP-TE may be used to establish high QoS route 111A over a packet-based network.

In the example illustrated in FIG. 1 it is assumed that a mobile switching center 112 sends a mobile originated WMS message to WMS QoS screening node 100 (step 1). In step 2, screening node 100 identifies the message as a WMS message and passes the message to WMS quality of service identifier 104. In step 3, WMS quality of service identifier 104 identifies the quality of service associated with the WMS message. In step 4, WMS quality of service identifier 104 routes the message to the WMSC that provides the indicated quality of service. Thus, the system illustrated in FIG. 1 includes an STP-based solution that provides differential quality of service for WMS messages.

Figure 2:
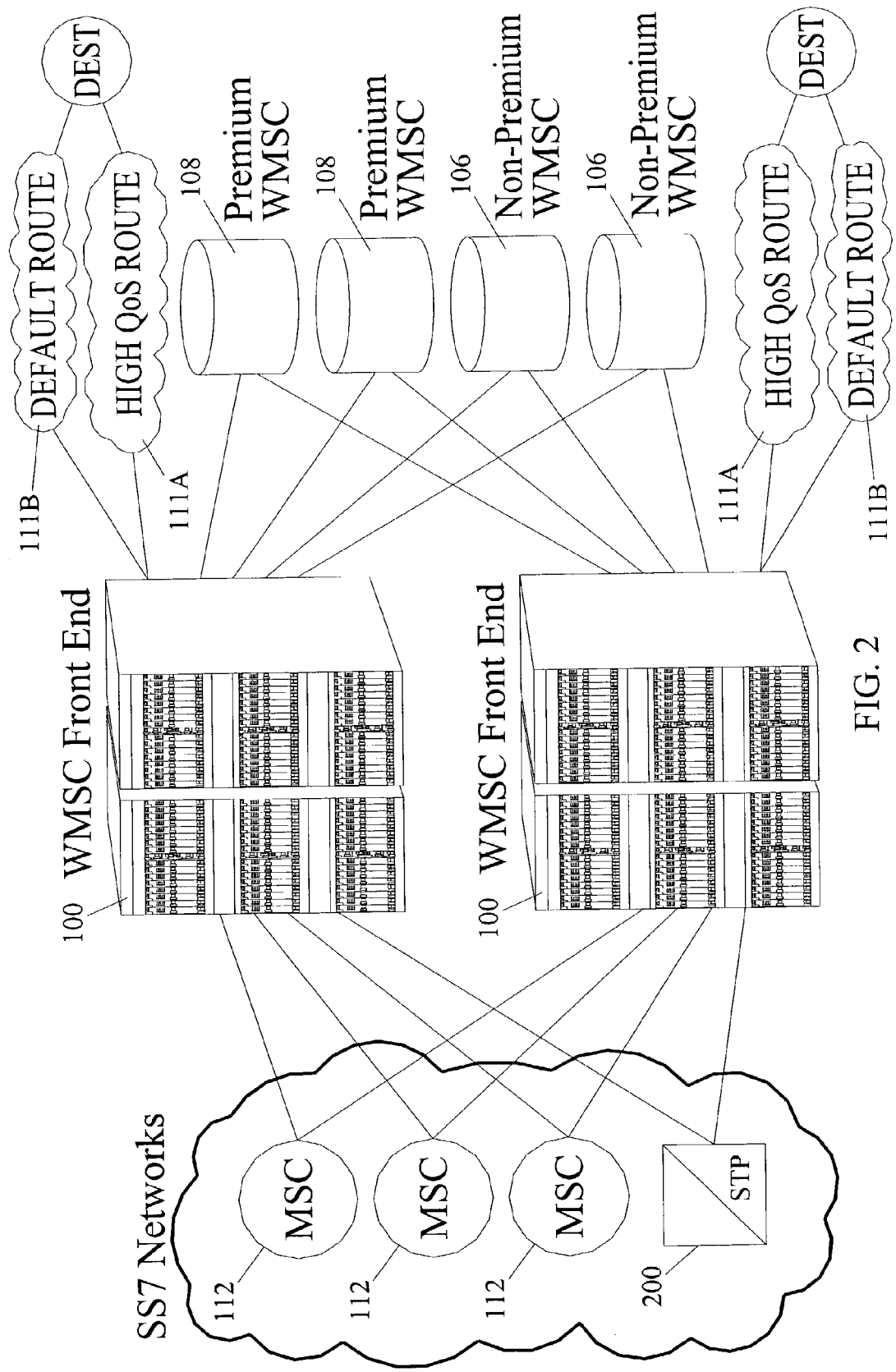
FIG. 2 is a network diagram of a system for triggerlessly screening WMS messages for delivery with differential quality of service according to an alternate embodiment of the invention.

FIG. 2 illustrates another embodiment of the invention in which WMS quality of service screening nodes are implemented as WMSC front ends, rather than signal transfer points. Referring to FIG. 2, WMS quality of service screening nodes 100 are each connected to a pair of premium WMSCs 108, a pair of non-premium WMSCs 106, a high QoS route 111A, and a default route 111B. A plurality of mobile switching centers 112 may be connected to screening nodes 100 for delivering WMS messages to screening nodes 100 and receiving WMS messages from wireless message service centers 106 and 108 via screening nodes 100. A signal transfer point 200 may also be connected to screening nodes 100 for routing WMS messages from other network nodes to and from screening nodes 100.

The operation of WMS QoS screening nodes 100 may be similar to that illustrated in FIG. 1. For example, WMS QoS screening nodes 100 may receive mobile originated WMS messages and mobile terminated WMS messages from MSCs 112 and STP 200. WMS QoS screening nodes 100 may identify the quality of service associated with these messages based on one or more parameters in the messages. Screening nodes 100 may then deliver the messages to the WMSC or the route that provides the appropriate quality of service. The difference between the embodiments illustrated in FIGS. 1 and 2 is that when screening nodes 100 act only as front ends for WMSCs, the processing time available for delivering WMS messages and hence the quality of service with which the messages can be delivered is increased.

Figure 3:
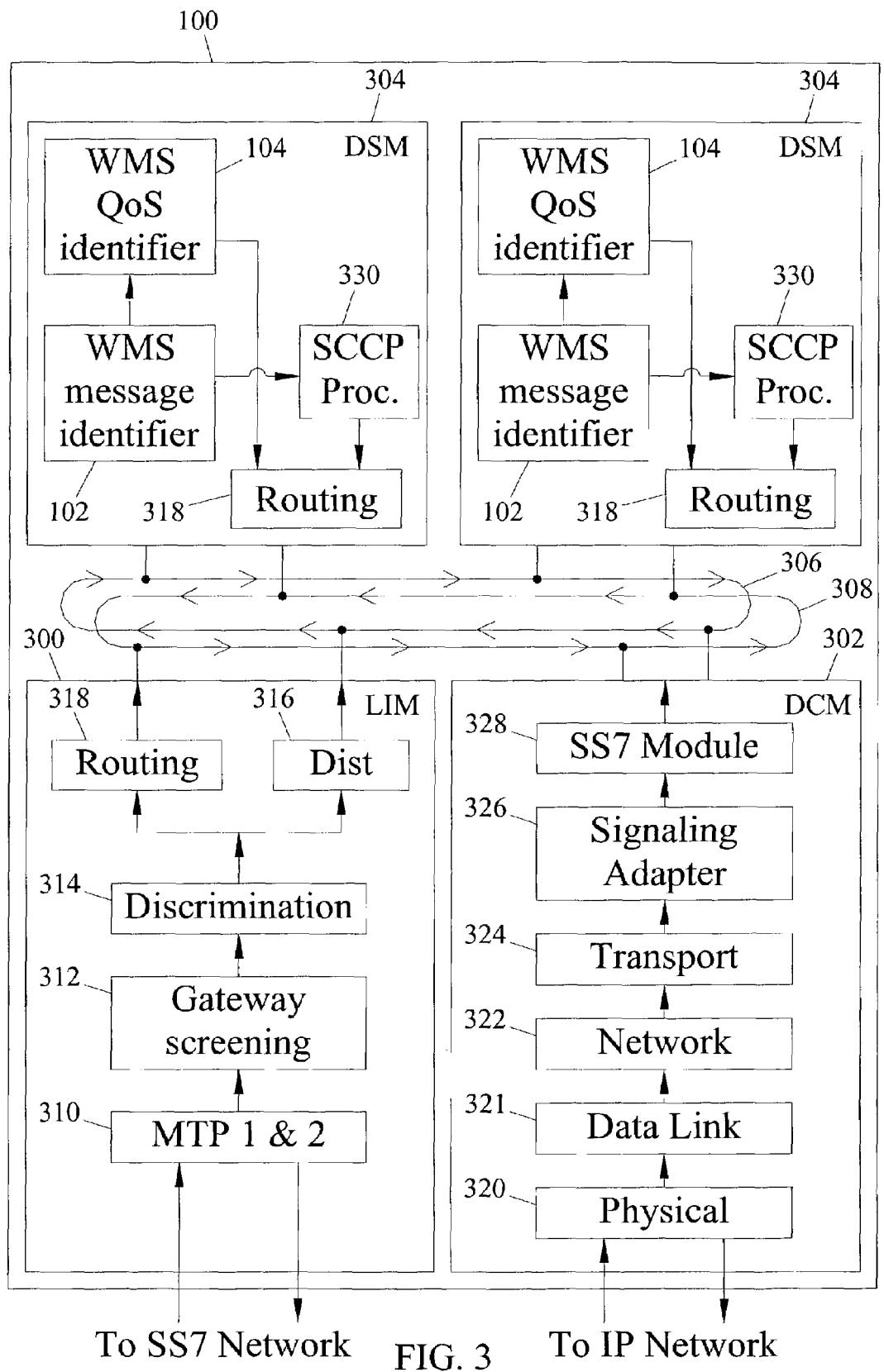
FIG. 3 is a block diagram of an exemplary architecture for a triggerless WMS QoS screening node according to an embodiment of the present invention.

FIG. 3 illustrates an exemplary internal architecture for triggerless WMS QoS screening node according to an embodiment of the present invention. In FIG. 3, triggerless WMS QoS screening node 100 includes a plurality of internal processing modules for processing WMS and other types of messages. In the illustrated example, triggerless WMS QoS screening node 100 includes a link interface module (LIM) 300 for sending and receiving messages via SS7 signaling links, a data communications module (DCM) 302 for sending and receiving messages via IP signaling links to identically provisioned database service modules (DSMs) 304 for identifying a quality of service associated with WMS messages and routing the messages to the appropriate destinations. Each internal processing module 300, 302, and 304 may include a printed circuit board, one or more microprocessors, and associated memory. In one example, each module 300, 302, and 304 may include an application processor for executing application programs and a communications processor for communicating with other modules via buses 306 and 308. Buses 306 and 308 may be a pair of counter-rotating rings. Each processing module 300, 302, and 304 may be connected to both buses 306 and 308, such that when one of the buses fails, communications between modules 300, 302, and 304 are not disabled.

LIM 300 includes a plurality of modules that may be implemented in hardware and/or software for performing SS7 communications functions. In the illustrated example, LIM 300 includes an MTP level 1 and 2 module 310 for performing MTP level 1 and 2 functions, such as error detection, error correction, and sequencing of SS7 messages. Gateway screening module 312 screens SS7 messages based on point codes in the messages to determine whether to allow the messages into the network. Discrimination module 314 analyzes destination point codes in received messages to determine whether the messages are addressed to screening node 100 or to another node. If the messages are addressed to screening node 100, discrimination module 314 forwards the messages to distribution module 316. Distribution module 316 distributes these messages to the appropriate processing module within screening node 100 for further processing. If the messages are not destined for an internal processing module, discrimination module 314 forwards the messages to routing module 318. Routing module 318 on LIM 300 routes the message to the processing module associated with the appropriate outbound signaling link.

DCM 302 includes a plurality of internal processing modules for sending and receiving messages over an IP network. In the illustrated example, DCM 302 includes a physical layer module 320 for performing OSI physical layer functions, such as sending and receiving messages over an electrical or optical interface. Datalink layer 321 ensures error free delivery between directly connected nodes. Network layer 322 performs network layer functions, such as maintaining IP routing tables and forwarding IP packets based on destination IP addresses. Transport layer 324 performs message transport functions, such as initiating and tearing down sessions between communicating entities. Signaling adapter layer 326 adapts higher layer signaling protocols for transport over an IP network. In this example, it is assumed that the signaling transported over the IP network is SS7 signaling. Accordingly, DCM 302 includes an SS7 module 328 for performing SS7 screening, discrimination, routing, and distribution functions similar to those described with regard to LIM 300.

DSMs 304 each include a WMS message identifier 102 for identifying whether received messages contain WMS content and a WMS quality of service identifier 104 for identifying the quality of service associated with WMS messages. If a message is determined to have WMS content, WMS message identifier 102 forwards the WMS message to WMS quality of service identifier 104. WMS quality of service identifier 104 identifies the quality of service associated with a message and modifies the message so that the message will be routed to the wireless message service center that provides the appropriate quality of service. If WMS message identifier 102 determines that a received message is not a WMS message, WMS message identifier 102 forwards the message to SCCP processor 330. SCCP processor 330 performs normal SCCP processing on the message, such as global title translation. DSM modules 304 also include a routing module 318 for routing messages to the appropriate destinations.

Figure 4:
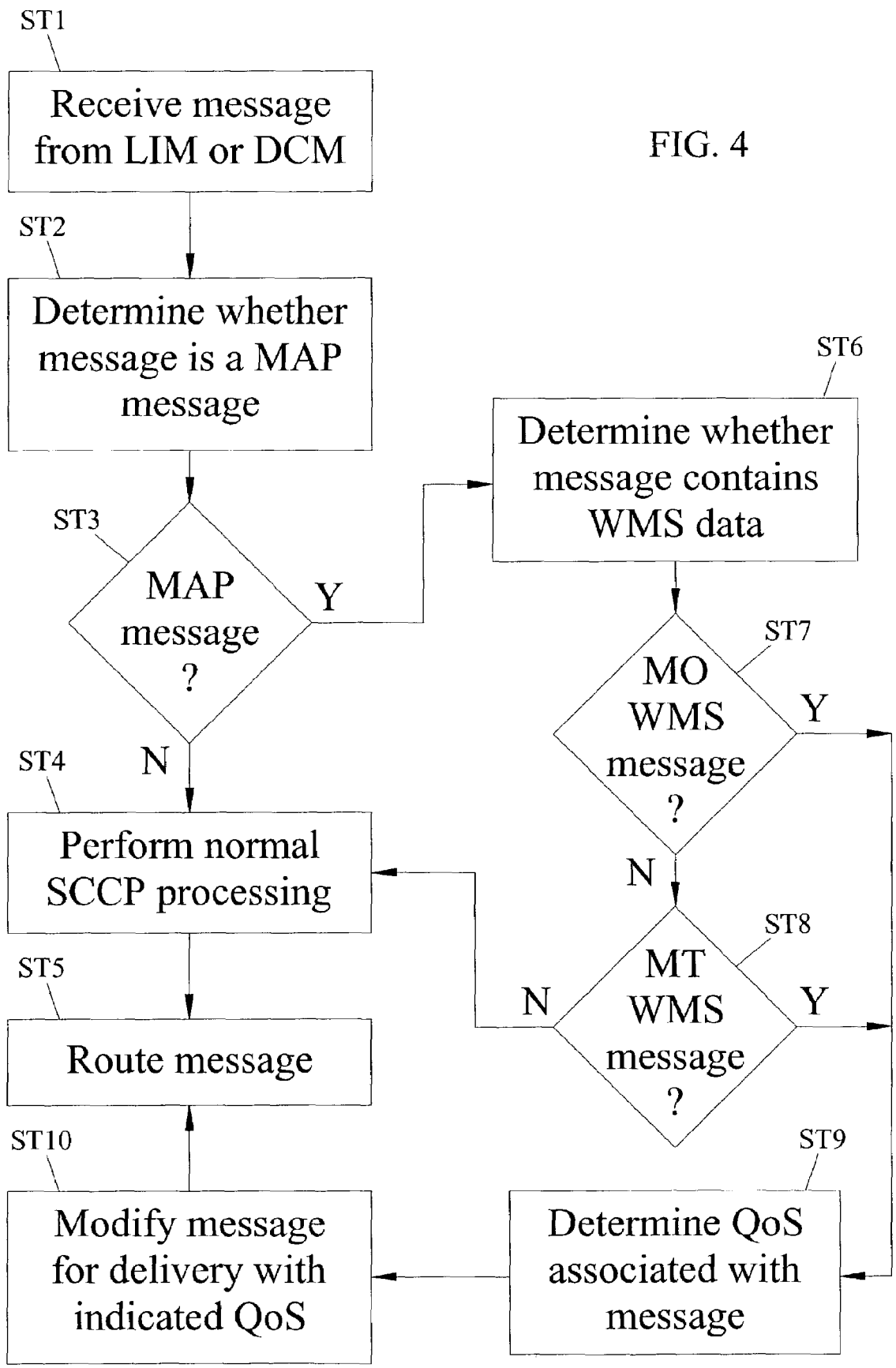
FIG. 4 is a flow chart illustrating exemplary steps performed by the screening node illustrated in FIG. 3 for triggerlessly screening WMS messages and delivering the messages with differential quality of service according to an embodiment of the present invention.

FIG. 4 is a flow chart illustrating exemplary steps that may be performed by WMS message identifier 102 and WMS quality of service identifier 104 in identifying WMS messages and modifying the messages for delivery with the indicated QoS. Referring to FIG. 4, in step ST1, WMS message identifier 102 receives a message from LIM 300 or DCM 302. As discussed above, LIM 300 and DCM 302 include processes that identify messages that require further internal processing. In this example, it is assumed that the received message is an SCCP message addressed to screening node 100. SCCP messages addressed to screening node 100 are preferably routed to one of DSMs 304 for further processing.

In steps ST2 and ST3, WMS message identifier 102 determines whether the message is a MAP message. The reason for determining whether the message is a MAP message is that MAP messages may be used to carry wireless message service messages, such as SMS, MMS, and EMS messages. However, the present invention is not limited to determining whether a message is a MAP message as a screening step for determining whether WMS QoS processing is required. Screening based on any protocol used to carry SMS, MMS, or EMS messages is intended to be within the scope of the invention.

In step ST3, if the message is not a MAP message, control proceeds to step ST4, where normal SCCP processing, such as global title translation, is performed on the message. Once the message is modified to include the appropriate destination address, in step ST5, the message is routed to its intended destination. If the message is a MAP message, the message may also be a WMS message, since WMS messages may be delivered using the MAP protocol. Since there are many types of MAP messages, some of which do not include WMS data, it is preferable to further determine whether the message includes WMS data.

Steps ST6–ST8 illustrate exemplary processing steps for determining whether a MAP message includes WMS data. One type of MAP message used to carry WMS data is a mobile originated wireless message service messages, such as a mobile originated forward short message message. MAP mobile originated forward short message messages are used between an MSC and an SMS interworking MSC to forward mobile originated short messages. Accordingly, in step ST7, it is determined whether the message is a mobile originated WMS message. If the message is not a mobile originated WMS message, control proceeds to step ST8 where it is determined whether the message is a mobile terminated WMS message. One example of a mobile terminated WMS message is a mobile terminated forward short message message. MAP mobile terminated forward short message messages are used between a gateway MSC and a serving MSC to forward mobile terminated short messages. If the message is not a mobile originated or mobile terminated WSM message, control returns to step ST4, where normal SCCP processing is performed and the message is routed to its intended destination.

If the message is either a mobile originated or mobile terminated WMS message, control proceeds to step ST9 where WMS quality of service identifier 104 determines the quality of service associated with the message. Determining the quality of service associated with the message may include extracting one or more parameters from the message and performing a lookup in a quality of service table resident on DSM 304. Exemplary data and logic for identifying the quality of service associated with a message will be discussed in detail below. Once the quality of service associated with a message has been identified, control proceeds to step ST10 where the message is modified for delivery with the indicated quality of service. Modifying the message for delivery with the indicated quality of service may include inserting routing information for the WMSC or route that provides the indicated quality of service. Alternatively, or in addition, the message may be marked, e.g., using an MPLS label, an IP precedence value, or a VLAN tag, for indicated the quality of service associated with the message. Once the message has been modified for delivery with the indicated quality of service, control proceeds to step ST5, where the message is routed to its intended destination.

Tables 1 and 2 shown below illustrate exemplary parameters that may be included in MAP mobile originated and mobile terminated forward short message messages and that may be used to determine the quality of service associated with a received WMS message.

TABLE 1

MAP-MO-FORWARD-SHORT-MESSAGE

| Parameter name | Request | Indication | Response | Confirm |
|---|---|---|---|---|
| Invoke Id | M | M(=) | M(=) | M(=) |
| SM RP DA | M | M(=) | | |
| SM RP OA | M | M(=) | | |
| SM RP UI | M | M(=) | C | C(=) |
| User error | | | C | C(=) |
| Provider error | | | | O |

TABLE 2

MAP-MT-FORWARD-SHORT-MESSAGE

| Parameter name | Request | Indication | Response | Confirm |
|---|---|---|---|---|
| Invoke Id | M | M(=) | M(=) | M(=) |
| SM RP DA | M | M(=) | | |
| SM RP OA | M | M(=) | | |
| SM RP UI | M | M(=) | C | C(=) |
| More Messages to Send | C | C(=) | | |
| User error | | | C | C(=) |
| Provider error | | | | O |

In Tables 1 and 2, "M" indicates a mandatory parameter, "C" indicates a confirmed parameter, "O" indicates an optional parameter, and "=" indicates that the parameter takes the same value as the parameter in the primitive immediately to its left in the tables. In the request primitive for both the MAP mobile originated and mobile terminated forward short message messages, a variety of parameters may be used either alone or in combination to determine the quality of service associated with a particular MAP message. Exemplary parameters that may be used include the short message relay protocol destination address (SM RP DA), and/or the short message relay protocol origination address (SM RP OA). According to the MAP protocol specifications, the short message relay protocol destination address parameter represents the destination address used by the short message service relay sublayer protocol. This parameter can be the IMSI, LMSI, MSISDN, roaming number, or service center address. The short message relay protocol origination address may include the MSISDN, or the service center that sent the message.

Table 3 shown below illustrates exemplary quality of service identification and routing information that may be used by WMS quality of service identifier 104 in identifying the quality of service associated with the message.

TABLE 3

QoS Identification and Routing Information

| MIN, MDN, IMSI, OR MSISDN PARAMETER | WMSC Routing Information |
|---|---|
| Police, EMT, Fire Dept. MDNs or MSISDNs | Premium level 1 WMSC address or level 1 route |
| Service-provider-defined MINs, MDNs, MSISDNs or IMSIs that should be given enhanced priority | Premium level 2 WMSC address or level 2 route |
| all other MINs, MDNs, MSISDNs or IMSIs | Default non-premium WMSC or default route |

In Table 3, the first column includes the parameter or key extracted from the WMS message used to perform a lookup in the table. In the illustrated example, the keys include MINs, MDNs, MSISDNs, and IMSIs. Since MDNs and MSISDNs are directory numbers, a first quality of service level may be defined for messages directed to high priority MDNs and MSISDNs. For example, the highest quality of service may be given to messages directed to the police, emergency medical technicians, and/or the fire department. The MSISDN and MDN values representing the directory numbers for these entities may be stored in the table and associated with a WMSC address or route that provides the highest quality of service. The next level of quality of service may include enhanced quality of service as defined by the service provider. For example, a telecommunications service provider may provide its users with an option of purchasing enhanced WMS service. In such an example, MIN, MDN, IMSI or MSISDN numbers associated with mobile subscribers that have purchased enhanced WMS service may be stored in the table and associated with a premium level 2 WMSC address or level 2 route. Finally, for MIN, MDN, IMSI or MSISDN numbers in received messages that are not associated with an enhanced quality of service, the table may include routing information for a default wireless message service center or a default route.

Figure 5:
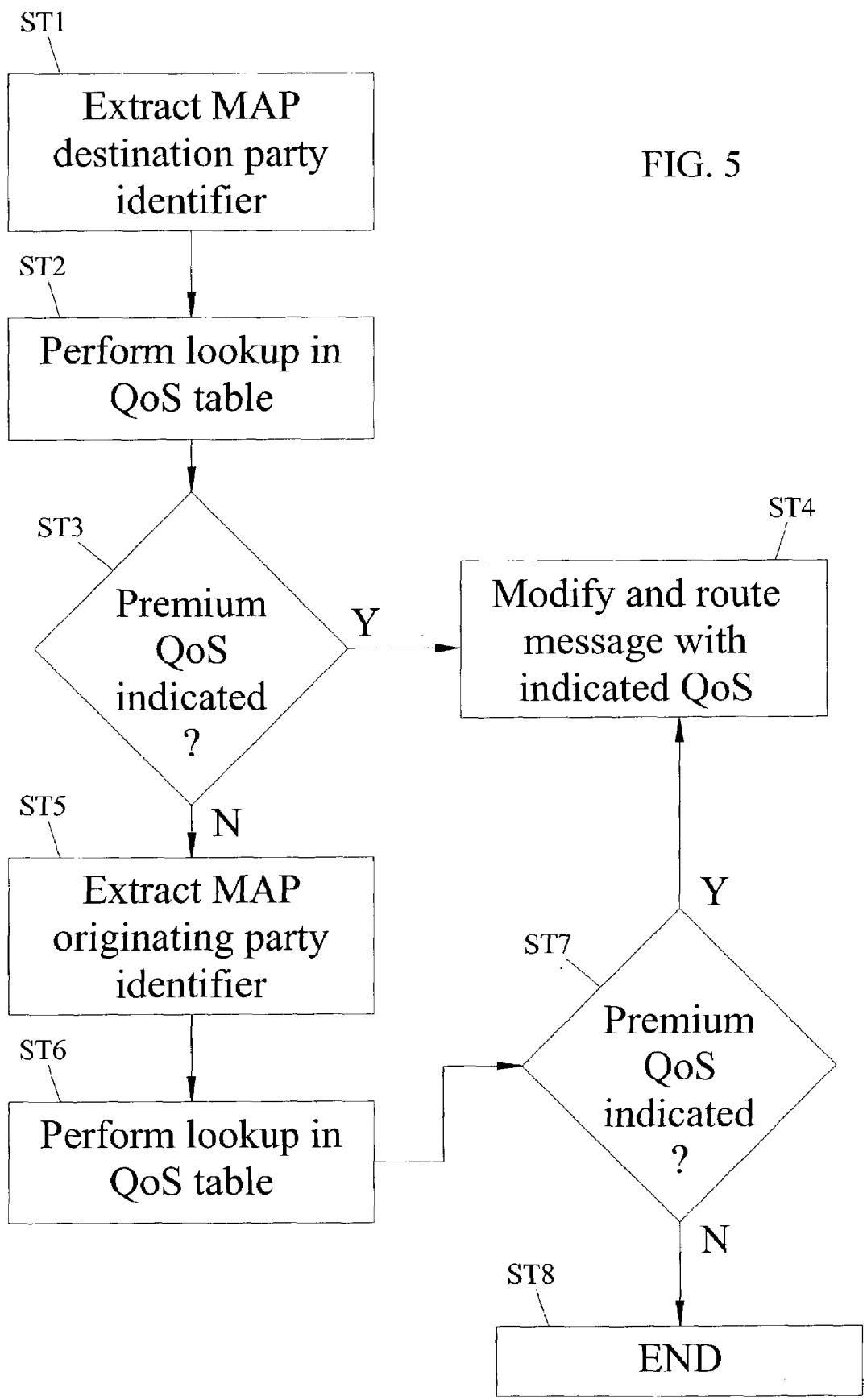
FIG. 5 is a flow chart illustrating exemplary steps that may be performed by the screening node illustrated in FIG. 3 in identifying the quality of service associated with an WMS message according to an embodiment of the present invention.

Since multiple parameters in a message may be used to determine the quality of service associated with a message, WMS quality of service identifier 104 preferably includes logic for identifying the correct quality of service. FIG. 5 is a flow chart illustrating exemplary steps that may be performed by WMS quality of service identifier 104 in determining the correct quality of service associated with a WMS message. Referring to FIG. 5, in step ST1, WMS quality of service identifier 104 extracts the destination party identifier from the message. In step ST2, WMS quality of service identifier 104 performs a lookup in the quality of service table using the destination party identifier. In step ST3, if premium quality of service is indicated by the MAP destination party identifier, in step ST4, WMS quality of service identifier 104 modifies the message and routes the message to a premium WMSC or route that provides the indicated quality of service.

If the destination party identifier does not indicate premium quality of service, rather than default routing the message, WMS quality of service identifier 104 may extract the originating party identifier (step ST5). In step ST6, WMS quality of service identifier 104 performs a lookup in the quality of service table. In step ST7, if premium quality of service is indicated, control proceeds to step ST4 where SMS quality of service identifier modifies the message and routes the message with the indicated quality of service. If premium quality of service is not indicated, control proceeds to step ST8 where premium quality of service processing ends.

In the scheme illustrated in FIG. 5, destination party parameters are given precedence over originating party parameters when determining the quality of service associated with an WMS message. In an alternate embodiment of the invention, originating party parameters may be given precedence over destination party parameters. Using any combination of origination and/or destination party identification information to identify the quality of service that should be given to a WMS message is intended to be within the scope of the invention.

Figure 6:
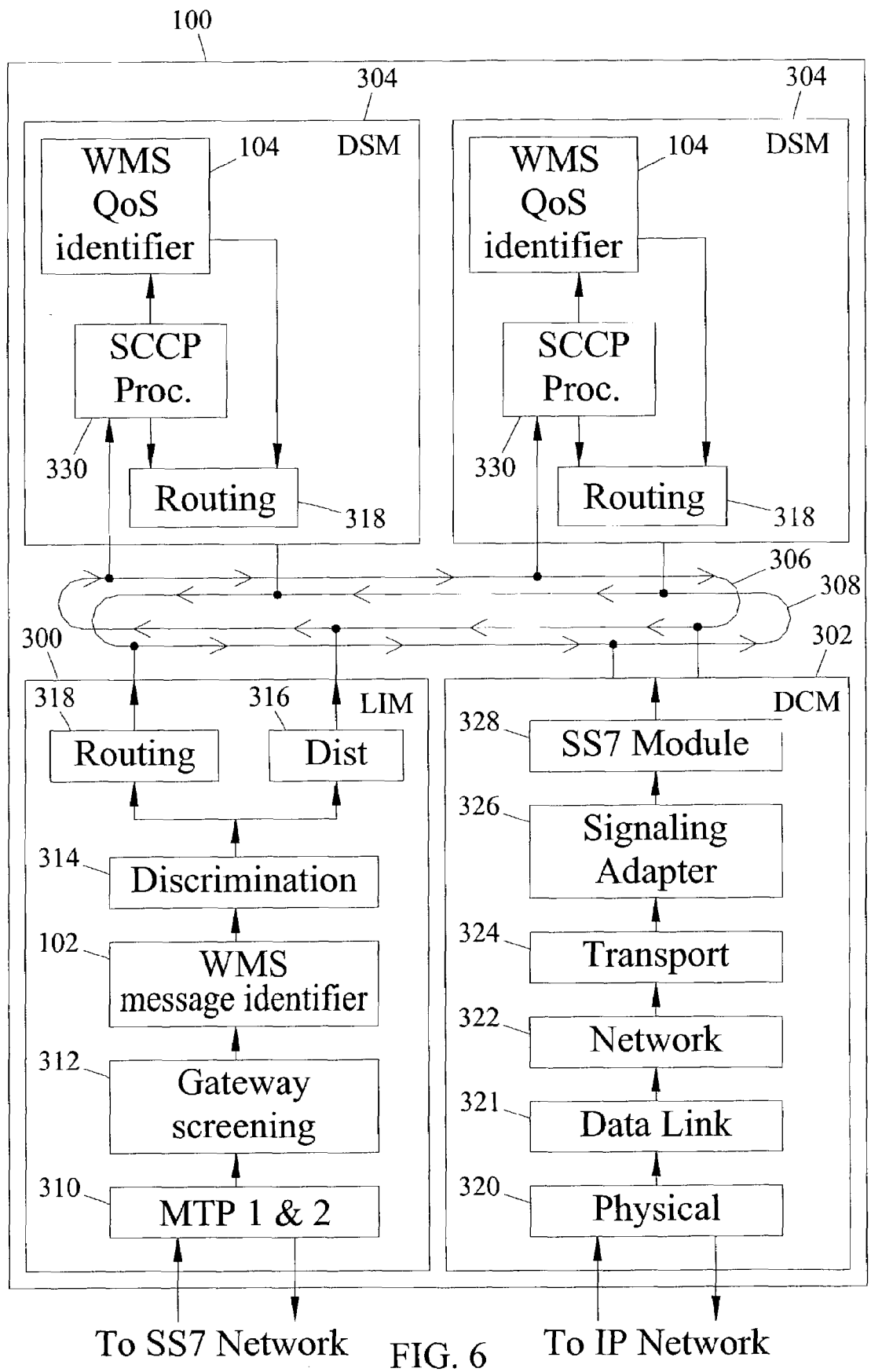
FIG. 6 is a block diagram of a triggerless WMS QoS screening node according to an alternate embodiment of the present invention.

In the exemplary triggerless WMS QoS screening node architecture illustrated in FIG. 3, it is assumed that WMS messages will be addressed to screening node 100. However, the present invention is not limited to such an embodiment. FIG. 6 illustrates an alternate embodiment of the invention in which WMS message identifier 102 is located on LIM 300 rather than DSM 304. In the embodiment illustrated in FIG. 6, after gateway screening, WMS message identifier 102 analyzes a message to determine whether it contains WMS content in the manner described above. If the message contains WMS content, WMS message identifier 102 encapsulates the message within an SCCP packet addressed to screening node 100. Discrimination module 314 analyzes the encapsulated message and determines that the message should be distributed to DSM 304. Accordingly, discrimination module 314 forwards the message to distribution process 316. Distribution process 316 forwards the message to DSM 304, where the message is analyzed to determine the quality of service associated with the message. Thus, in the embodiment illustrated in FIG. 6, even when a WMS message is not addressed to screening node 100, the message is internally modified such that it appears to the distribution and discrimination processes that the message is addressed to screening node 100.

Although the examples described above relate primarily to GSM protocols for providing wireless message services, the present invention is not limited to GSM protocols. For example, in an alternate embodiment of the invention, WMS screening node 100 may identify ANSI IS-41 messages that contain wireless message service content and provide differential quality of service for these messages. Much of the processing for ANSI WMS messages will be similar to that for GSM WMS messages. For example, according to ANSI IS-41 Revision C, the MAP protocol is used to carry SMS messages. IS-41 MAP messages include opcode values that indicate the type of MAP message. Exemplary IS-41 MAP messages that may be identified by WMS message identifier 102 are SMS delivery point-to-point messages, SMS delivery forward messages, and SMS delivery backward messages. SMS deliver point-to-point messages are used to convey short messages to their intended destinations. SMS delivery forward messages are used to convey a mobile terminated short message to the serving MSC after handoff. SMS delivery backward messages are used to convey mobile originated short messages to the anchor MSC after handoff.

In order to determine whether IS-41 SMS messages require enhanced quality of service treatment, originating party and/or destination party information may be extracted from the MAP portions of the messages. An SMS originating address parameter that may be used by WMS quality of service identifier 104 is the SMS originating address parameter. An SMS destination address parameter that may be used by WMS quality of service identifier is the SMS destination address parameter. The SMS originating address parameter contains the current routing address of the originating mobile station. The SMS destination address parameter conveys the address of a destination short message entity. WMS quality of service identifier 104 may use either or both of these parameters to determine the quality of service associated with IS-41 SMS message and forward the message to its intended destination with the indicated quality of service, as discussed above.

Thus, as described herein, the present invention includes methods and systems for identifying WMS messages, determining the qualities of service associated with the WMS messages, and delivering the WMS messages to wireless message service centers or routes for providing the desired quality of service. A screening node located between the MSC or gateway MSC and a wireless message service center automatically intercepts messages and determines the appropriate quality of service. As a result, there is no need for complex processing logic to be included in the MSCs.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for routing wireless message service (WMS) signaling messages in a communications network with a desired quality of service (QoS), the method comprising:
    (a) receiving a WMS signaling message including mobile subscriber originating and destination party identification information and WMS content;
    (b) determining, based on at least one of the originating and destination party identification information, a QoS associated with the signaling message; and
    (c) routing the signaling message to a destination through a signaling network with the indicated QoS.

2. The method of claim 1 wherein receiving a WMS signaling message includes receiving a WMS signaling message at a signal transfer point.

3. The method of claim 2 wherein receiving a WMS signaling message at a signal transfer point includes receiving a WMS signaling message addressed to the signal transfer point.

4. The method of claim 2 wherein receiving a WMS signaling message at a signal transfer point include intercepting, at the signal transfer point, a WMS signaling addressed to a node other than the signal transfer point.

5. The method of claim 1 wherein receiving a WMS signaling message includes receiving a multimedia service (MMS) signaling message.

6. The method of claim 1 wherein receiving a WMS signaling message includes receiving an enhanced message service (EMS) message.

7. The method of claim 1 wherein the originating and destination party identification information includes mobile subscriber ISDN (MSISDN) numbers.

8. The method of claim 1 wherein the originating and destination party identification information includes international mobile station identifiers (IMSIs).

9. The method of claim 1 wherein the originating and destination party identification information includes mobile directory numbers (MDNs).

10. The method of claim 1 wherein the originating and destination party identification information includes mobile identification numbers (MINs).

11. The method of claim 1 wherein the determining step is performed based on the originating party information.

12. The method of claim 1 wherein the determining step is performed based on the destination party information.

13. The method of claim 1 wherein determining the QoS includes selecting between multiple QoS levels for providing different WMS delivery speeds.

14. The method of claim 1 determining the QoS includes selecting between a first QoS level that guarantees WMS delivery within a predetermined time period and a second level that does not.

15. The method of claim 1 wherein determining the QoS includes selecting between a first QoS level that provides message delivery confirmation and a first message delivery priority and a second QoS level that does not provide message delivery confirmation and that provides a second message delivery priority lower than the first message delivery priority.

16. The method of claim 1 wherein determining the QoS includes selecting between an emergency QoS level and a non-emergency QoS level.

17. The method of claim 1 wherein determining the QoS includes determining the QoS based on information extracted from the IS-41 MAP SMS originating address of the message.

18. The method of claim 1 wherein determining the QoS includes determining the QoS based on information extracted from the IS-41 MAP destination address of the message.

19. The method of claim 1 wherein determining the QoS includes determining the QoS based on information extracted from the GSM MAP relay protocol origination address of the message.

20. The method of claim 1 wherein determining the QoS includes determining the QoS based on information extracted from the GSM MAP relay protocol destination address of the message.

21. The method of claim 1 wherein routing the signaling message to a destination with the indicated quality of service includes routing the message to a wireless message service center that provides the indicated quality of service.

22. The method of claim 1 wherein routing the signaling message to a destination with the indicated QoS includes routing the message over a route that provides the indicated QoS.

23. A system for routing wireless message service (WMS) signaling messages in a communications network with a desired quality of service (QoS), the system comprising:

(a) a communications module for sending and receiving WMS signaling messages, each message including a mobile subscriber identifier;

(b) a WMS quality of service identifier operatively associated with the communications module for determining, based on the mobile subscriber identifier associated with one of the WMS signaling messages, a QoS associated with the signaling message and for modifying the message to include muting information for providing the indicated QoS for the signaling message through the signaling network; and (c) a routing module operatively associated with the WMS QoS identifier for forwarding the signaling message to a destination based on the routing information.

24. The system of claim 23 wherein the communications module and the WMS quality of service identifier are located within a signaling system 7 network element.

25. The system of claim 24 wherein the SS7 network element is a signal transfer point.

26. The system of claim 23 wherein the communications module and the WMS QoS identifier are located within an Internet protocol network element.

27. The system of claim 25 wherein the communications module is adapted to triggerlessly intercept messages containing WMS content that are not addressed to the signal transfer point.

28. The system of claim 23 wherein the mobile subscriber identifier includes a mobile subscriber ISDN (MSISDN) number.

29. The system of claim 23 wherein the mobile subscriber identifier includes an international mobile station identifier (IMSI).

30. The system of claim 23 wherein the mobile subscriber identifier includes a mobile directory number (MDN).

31. The method of claim 23 wherein the mobile subscriber identifier includes a mobile identification number (MIN).

32. The system of claim 23 wherein the mobile subscriber identifier identifies a message originator.

33. The system of claim 23 wherein the mobile subscriber identifier identifies a message recipient.

34. The system of claim 23 wherein the WMS QoS identifier is adapted to select between first and second QoS levels, the first QoS level providing greater WMS delivery speed than the second QoS level.

35. The system of claim 23 wherein the WMS QoS identifier is adapted to select between first and second QoS levels, the first QoS level providing shorter WMS delivery time than the second QoS level.

36. The system of claim 23 wherein the WMS QoS identifier is adapted to select between first and second QoS levels, the first QoS level providing WMS message delivery confirmation and enhanced delivery priority and the second QoS level providing default delivery priority without WMS delivery confirmation.

37. The system of claim 23 wherein the WMS QoS identifier is adapted to select between first and second QoS levels, the first QoS level providing emergency WMS delivery service and the second QoS level providing non-emergency WMS delivery service.

38. The system of claim 23 wherein the WMS QoS identifier gives precedence to calling party information over called party information when identifying the QoS associated with a WMS message.

39. The system of claim 23 wherein the WMS QoS identifier gives precedence to called party information over calling party information when identifying the QoS associated with a WMS message.

40. The method of claim 23 wherein the routing module is adapted to forward the message to a wireless message service center for providing the indicated quality of service.

41. The system of claim 23 wherein the routing module is adapted to forward the message over a route for providing the indicated quality of service.

42. A module for identifying the quality of service (QoS) to be given to wireless message service (WMS) messages and for modifying the messages for delivery with the indicated QoS, the module comprising:
(a) a WMS message identifier for identifying signaling messages containing WMS content;
(b) a WMS QoS identifier for receiving the signaling messages from the WMS message identifier that contain the WMS content, for identifying the quality of service to be given to each message, and for modifying each message for delivery through a signaling network with the indicated QoS; and
(c) a routing module for forwarding the WMS signaling messages to destinations with the indicated quality of service.

43. The module of claim 42 wherein the WMS message identifier is adapted to identify short message service (SMS) messages containing SMS content.

44. The module of claim 42 wherein the WMS message identifier is adapted to identify multimedia message service (MMS) messages containing MMS content.

45. The module of claim 42 wherein the WMS message identifier is adapted to identify enhanced message service (EMS) messages containing EMS content.

46. The module of claim 42 wherein the WMS quality of service identifier is adapted to modify the messages to include routing information of one of a plurality of WMSCs for providing different qualities of service.

47. The module of claim 42 wherein the WMS QoS identifier is adapted to modify the messages to include routing information of a route for providing enhanced QoS.

48. The module of claim 42 wherein the WMS QoS identifier is adapted to mark the messages with priority information to indicate the quality of service that should be given to each message.

49. The module of claim 48 wherein the priority information includes a multi-protocol label switching (MPLS) label.

50. The method of claim 48 wherein the priority information includes a virtual local area network (VLAN) tag.

51. The method of claim 48 wherein the priority information includes an IP precedence indicator.

* * * * *